(12) United States Patent
Lin et al.

(10) Patent No.: US 10,142,678 B2
(45) Date of Patent: Nov. 27, 2018

(54) VIDEO PROCESSING DEVICE AND METHOD

(71) Applicant: MStar Semiconductor, Inc., Hsinchu Hsien (TW)

(72) Inventors: Chin-Lung Lin, Hsinchu County (TW); Te-Chuan Wang, Hsinchu County (TW); Chi-En Peng, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 120 days.

(21) Appl. No.: 15/603,633

(22) Filed: May 24, 2017

(65) Prior Publication Data
US 2017/0347052 A1      Nov. 30, 2017

Related U.S. Application Data

(60) Provisional application No. 62/343,830, filed on May 31, 2016.

(51) Int. Cl.
*H04N 21/4363* (2011.01)
*G09G 5/00* (2006.01)

(52) U.S. Cl.
CPC ......... *H04N 21/43635* (2013.01); *G09G 5/00* (2013.01)

(58) Field of Classification Search
CPC .................................................... H04N 19/423
(Continued)

(56) References Cited

U.S. PATENT DOCUMENTS

| 5,229,758 A | * | 7/1993 | Hsu | G09G 5/363 |
| | | | | 345/27 |
| 5,717,947 A | * | 2/1998 | Gallup | G06F 7/544 |
| | | | | 712/22 |

(Continued)

FOREIGN PATENT DOCUMENTS

| CN | 105578105 | 5/2016 |
| TW | 201539424 | 10/2015 |

OTHER PUBLICATIONS

Yeh, Chun Wen et al., "HDMI receiving circuit and method of determining transmission mode", filed on Jun. 22, 2016, Taiwan Application No. 105119511, Taiwan.
(Continued)

*Primary Examiner* — Paulos M Natnael
(74) *Attorney, Agent, or Firm* — WPAT, PC

(57) ABSTRACT

A video processing device capable of automatically determining an operation mode is provided. The video processing device includes a control signal processing circuit and a controller. The control signal processing circuit receives a control signal from a transmitter, and, according to at least one data access address indicated by the control signal, performs at least steps of determining whether the data access address satisfies a predetermined access address, and outputting a notification signal when the data access address satisfies the predetermined access address. The controller causes the video processing device to operate in a first mode according to the notification signal, and causes the video processing device to operate in a second mode when the notification signal is not received within a predetermined time interval.

17 Claims, 10 Drawing Sheets

(58) Field of Classification Search
USPC ....... 348/558, 567, 569, 571, 523, 516, 515, 348/719, 474, 608, 636, 647, 680, 693, 348/706, 714, 716, 718, 720, 723, 739, 348/361, 385.1, 255, 247, 231.1, 69, 348/14.04; 370/379, 382, 383, 392, 475
See application file for complete search history.

(56) References Cited

U.S. PATENT DOCUMENTS

| | | | |
|---|---|---|---|
| 9,460,486 B2* | 10/2016 | Ohba | G06T 11/00 |
| 2001/0056526 A1* | 12/2001 | Miki | G06F 9/345 |
| | | | 711/211 |
| 2003/0137979 A1* | 7/2003 | Hayon | H04L 47/24 |
| | | | 370/392 |
| 2005/0097171 A1* | 5/2005 | Hikichi | H04L 51/28 |
| | | | 709/204 |
| 2005/0273538 A1* | 12/2005 | Teranuma | G06F 13/4036 |
| | | | 710/110 |
| 2006/0195693 A1* | 8/2006 | Kandasamy | G06F 21/57 |
| | | | 713/166 |
| 2008/0129882 A1* | 6/2008 | Moriyama | G06F 3/14 |
| | | | 348/723 |
| 2008/0263146 A1* | 10/2008 | Habuto | G06F 1/1632 |
| | | | 709/203 |
| 2010/0073455 A1* | 3/2010 | Iwabuchi | H04N 7/142 |
| | | | 348/14.04 |
| 2013/0221749 A1* | 8/2013 | Lee | H02J 3/008 |
| | | | 307/43 |
| 2013/0329138 A1* | 12/2013 | Minemura | G09G 5/006 |
| | | | 348/720 |
| 2014/0205243 A1* | 7/2014 | Baker | H01R 31/005 |
| | | | 385/77 |
| 2014/0254452 A1* | 9/2014 | Golitschek Edler Von Elbwart | H04W 52/0216 |
| | | | 370/311 |
| 2015/0109978 A1* | 4/2015 | Berntsen | H04W 52/0216 |
| | | | 370/311 |
| 2015/0304993 A1* | 10/2015 | Shimezawa | H04L 5/001 |
| | | | 370/329 |
| 2016/0044273 A1* | 2/2016 | Thompson | H04N 5/268 |
| | | | 348/569 |
| 2016/0127771 A1* | 5/2016 | Pasqualino | H04N 21/43635 |
| | | | 348/474 |
| 2017/0090800 A1* | 3/2017 | Alexandrovich | G06F 3/0622 |
| 2017/0150480 A1* | 5/2017 | Kim | H04W 72/02 |
| 2017/0195722 A1* | 7/2017 | Seo | H04N 21/43635 |
| 2017/0257273 A1* | 9/2017 | Li | H04L 43/08 |
| 2017/0287384 A1* | 10/2017 | Lee | G09G 3/20 |
| 2017/0374242 A1* | 12/2017 | Yeh | G09G 5/008 |

OTHER PUBLICATIONS

MStar Semiconductor Inc. "HDMI receiving circuit and method of determining transmission mode", filed on Jun. 22, 2016, Taiwan Application No. 105119511, Taiwan.

* cited by examiner

VIDEO PROCESSING DEVICE AND METHOD

This application claims the benefit of U.S. Provisional Application Ser. No. 62/343,830, filed May 31, 2016, the subject matter of which is incorporated herein by reference.

BACKGROUND OF THE INVENTION

Field of the Invention

The invention relates in general to a video processing device and method, and more particularly to a video processing device and method capable of automatically determining an operation mode.

Description of the Related Art

High Definition Multimedia Interface (HDMI) is a video and audio transmission interface extensively applied. There are numerous versions of HDMI, including earlier versions (e.g., HDMI 1.4) and newer versions (e.g., HDMI 2.0).

After a connection is established between an HDMI transmitter and an HDMI receiver, the transmitter asks the receiver to provide extended display identification data (EDID). In the event that the transmitter transmits signals to the receiver according to one HDMI version (HDMI 1.4) while the receiver provides EDID of another HDMI version (e.g., HDMI 2.0), the transmitter may not be able to identify the EDID from the receiver and hence stop transmitting signals to the receiver.

In current technologies, a user interface (e.g., on-screen display (OSD)) is provided to a user to allow the user to select the desired HDMI version through the interface. If the HDMI version (e.g., HDMI 2.0) that the user selects is not supported by the transmitter, the transmitter may not be able to identify the EDID the receiver provides and stop transmitting signals to the receiver. At this point, the user needs to again select another HDMI version through the user interface. The above manual selection is time-consuming as well as inconvenient for the user.

SUMMARY OF THE INVENTION

It is an object of the present invention to provide a video processing device and method capable of automatically determining an operation mode to prevent issues of the prior art.

The present invention discloses a video processing device, which includes a memory and a control signal processing circuit according to an embodiment of the present invention. The memory stores a display parameter of a predetermined mode. The control signal processing circuit receives a control signal from a transmitter, and performs at least steps 1, 2 and 3 or performs at least steps 1, 4 and 5 below according to at least one data access address indicated by the control signal.

In Step 1, it is determined whether the data access address satisfies a predetermined access address.

In Step 2, when the data access address satisfies the predetermined access address and the predetermined mode is a first mode, the display parameter of the predetermined mode is outputted to the transmitter.

In Step 3, when the data access address does not satisfy the predetermined access address and the predetermined mode is a first mode, a display parameter of a second mode is outputted to the transmitter after the display parameter of the predetermined mode in the memory is replaced by the display parameter of the second mode.

In Step 4, when the data access address satisfies the predetermined access address and the predetermined mode is the second mode, a display parameter of the first mode is outputted to the transmitter after the display parameter of the predetermined mode in the memory is replaced by the display parameter of the first mode.

In Step 5, when the data access address does not satisfy the predetermined access address and the predetermined mode is the second mode, the display parameter of the predetermined mode is outputted to the transmitter.

According to another embodiment of the present invention, the video processing device includes a control signal processing circuit and a controller. The control signal processing circuit receives a control signal from a transmitter, and, according to at least one data access address indicated by the control signal, performs at least steps of determining whether the data access address satisfies a predetermined access address, and outputting a notification signal when the data access address satisfies the predetermined access address. The controller causes the video processing device to operate in a first mode according to the notification signal, and causes the video processing device to operate in a second mode when the notification signal is not received within a predetermined time interval.

The present invention further discloses a video process method, which is performed by the video processing device of the present invention or an equivalent device. According to an embodiment of the present invention, the video processing method includes: receiving a control signal from a transmitter; determining whether the control signal asks to access status and control data channel (SCDC) data; causing the video processing device to operate in a first mode when it is determined that the control signal asks to access the SCDC data; and causing the video processing device to operate in a second mode when it is determined that the control signal does not ask to access the SCDC data.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIG. 4 shows signals transceived by the video processing device in

FIG. 3;

DETAILED DESCRIPTION OF THE INVENTION

The present invention discloses a video processing device and method that may be applied to a High Definition Multimedia Interface (HDMI) receiver. The device and method are capable of automatically determining an operation mode to prevent numerous user inconveniences of the prior art.

Figure 1:
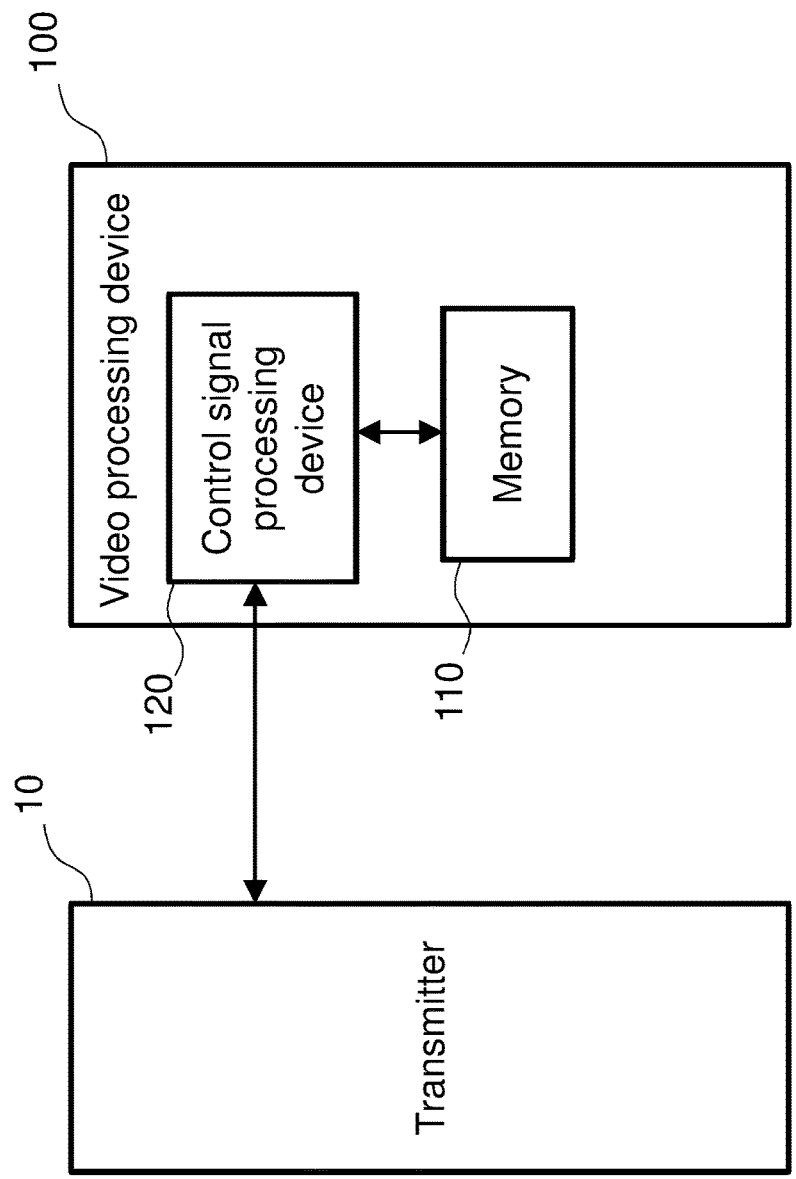
FIG. 1 is a block diagram of a video processing device according to an embodiment of the present invention.
Figure 2:
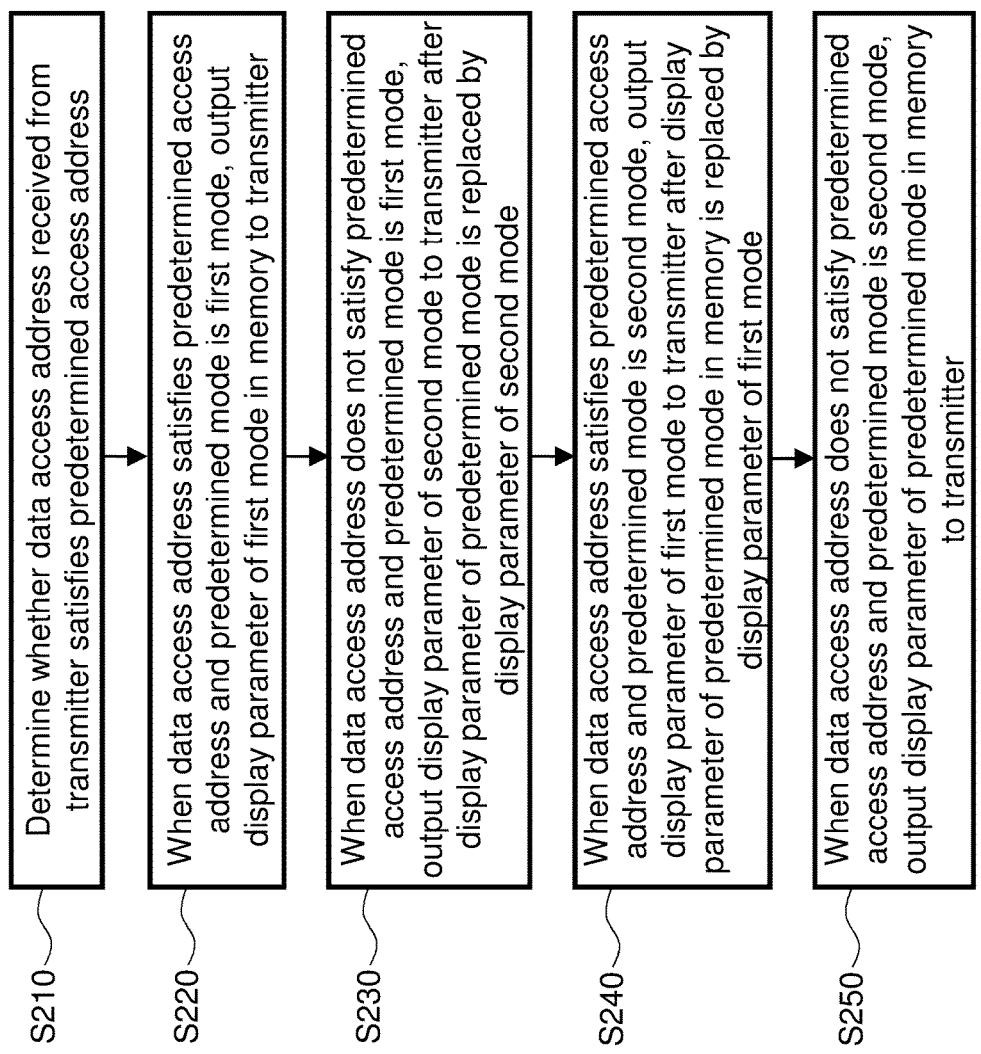
FIG. 2 is a flowchart of steps performed by a control signal processing circuit in FIG. 1.

FIG. 1 shows a block diagram of a video processing device according to an embodiment of the present invention. A video processing device 100 in FIG. 1 includes a memory 110 and a control signal processing circuit 120. The memory 110 stores a display parameter of a predetermined mode, which is one of a first mode and a second mode. In this embodiment, the first mode is compliant with the specifications of HDMI 2.0 or later versions (e.g., HMID 2.1), and the second mode is compliant with the specifications of versions before HDMI 2.0 (e.g., HDMI 1.4). It should be noted that these examples are for illustrating but not limiting the present invention. The control signal processing circuit 120 receives a control signal from a transmitter 10, and performs at least steps S210, S220 and S230 or performs at least steps S210, S240 and S250 shown in FIG. 2 according to at least one data access address (to be referred to as the data access address) indicated by the control signal.

In step S210, it is determined whether the data access address received from transmitter 10 satisfies a predetermined access address. In this embodiment, the predetermined access address is an address of status and control data channel (SCDC) data. However, addresses of data for identifying different video transmission specifications may also be adopted in the present invention.

In step S220, when the data access address satisfies the predetermined access address and the predetermined mode is a first mode, the display parameter of the predetermined mode in the memory 110 is outputted to the transmitter 10.

In step S230, when the data access address does not satisfy the predetermined access address and the predetermined mode is the first mode, after the display parameter of the predetermined mode in the memory 110 is replaced by a display mode of the second mode, the display parameter of the second mode is outputted to the transmitter. In this embodiment, the term "replace" may be an overwriting operation performed by a controller (e.g., a controller 310 in FIG. 3). The overwriting operation erases the display parameter of the predetermined mode from the memory 110, and writes the display parameter of the second mode (step S230) or the display parameter of the first mode (step S240) to the memory 110. The term "replace" may also refer to an address association operation performed by the control signal processing circuit 120. The address associated operation changes the data access address indicated by the transmitter 10 from a storage address associated with the display parameter of the predetermined mode to a storage address associated with the display parameter of the second mode (step S230), or to a storage address associated with the display parameter of the first mode (step S240). At this point, the display parameters of the first and second modes may be selectively simultaneously stored in the memory 110. Details of the above erasing operation and the address association operation individually are generally known to one person skilled in the art.

In step S240, when the data access address satisfies the predetermined access address and the predetermined mode is the second mode, after the display parameter of the predetermined mode in the memory 110 is replaced by the display parameter of the first mode, the display parameter of the first output mode is outputted to the transmitter 10.

In step S250, when the data access address does not satisfy the predetermined access address and the predetermined mode is the second mode, the display parameter of the predetermined mode in the memory 110 is outputted to the transmitter 10.

With the above steps, according to the data access address indicated by the transmitter 10, the control signal processing circuit 120 may determine whether the operation mode of the transmitter 10 corresponds to the first mode (when the data access address includes the address of the SCDC data) or the second mode (when the access address does not include the address of the SCDC data), and outputs the display parameter of the first mode or the second mode to the transmitter 10. In this embodiment, the control signal processing circuit 120 includes an inter-integrated circuit ($I^2C$) circuit. The $I^2C$ circuit may access data at a corresponding storage address in the memory 110 according to the data access address indicated by the transmitter 10, and notify a controller (e.g., the controller 310 in FIG. 3) when the data access address satisfies the predetermined access address for the controller to confirm that the operation mode of the transmitter 10 corresponds to the first mode. Further, the control signal processing circuit 120 receives the control signal from the transmitter 10 via a display data channel (DCC). However, in possible implementation, the types of the circuits and channels are not to be construed as limitations to the control signal processing circuit 120.

Figure 3:
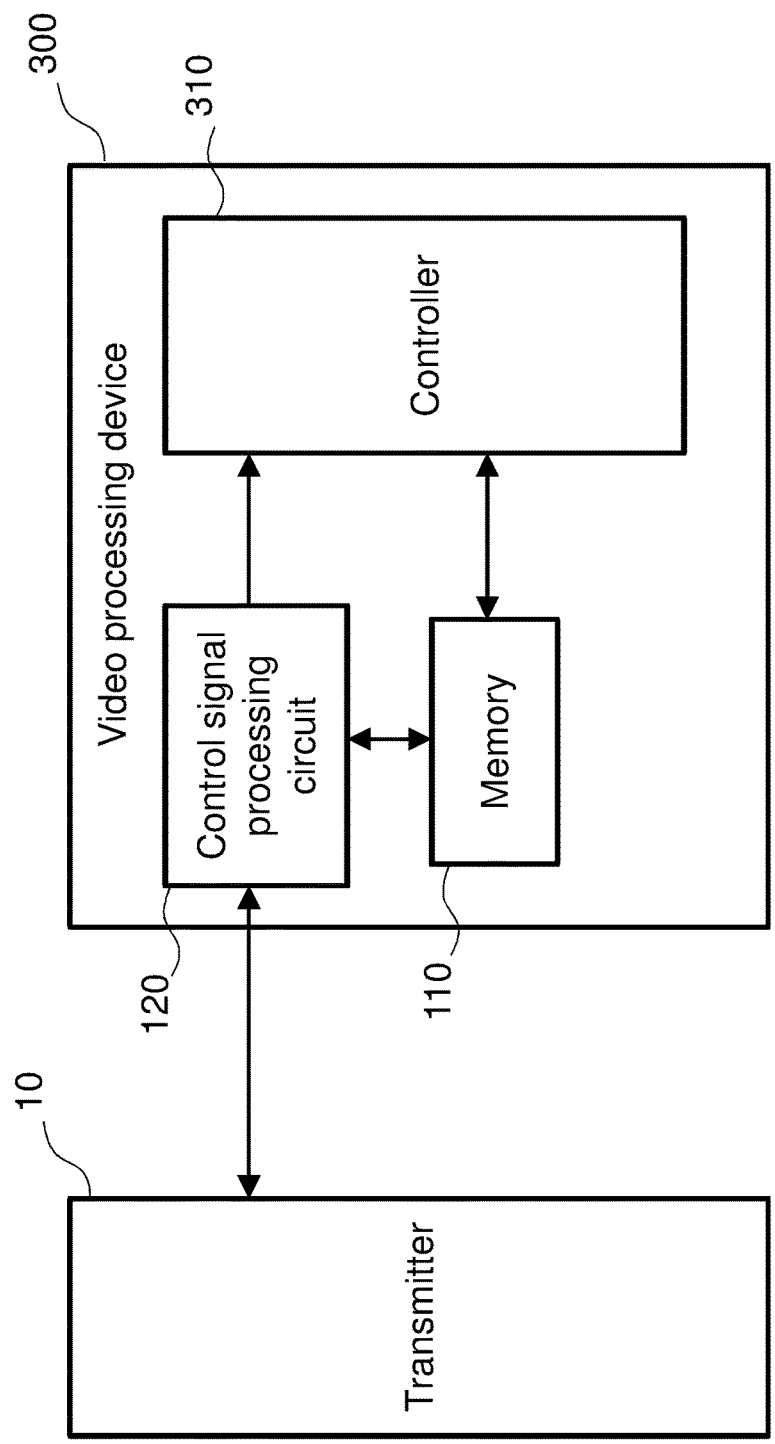
FIG. 3 is a block diagram of a video processing device according to another embodiment of the present invention.

FIG. 3 shows a block diagram of a video processing circuit according to another embodiment of the present invention. A video processing circuit 300 in FIG. 3 further includes a controller 310. When the control signal processing circuit 120 determines that the data access address satisfies the predetermined access address within a predetermined time interval, the controller 310 causes the video processing device 300 to operate in the first mode. When the control signal processing circuit 120 does not determine that the data access address satisfies the predetermined access address within the predetermined time interval, the controller 310 causes the video processing device 300 to operate in a second mode.

Figure 4:
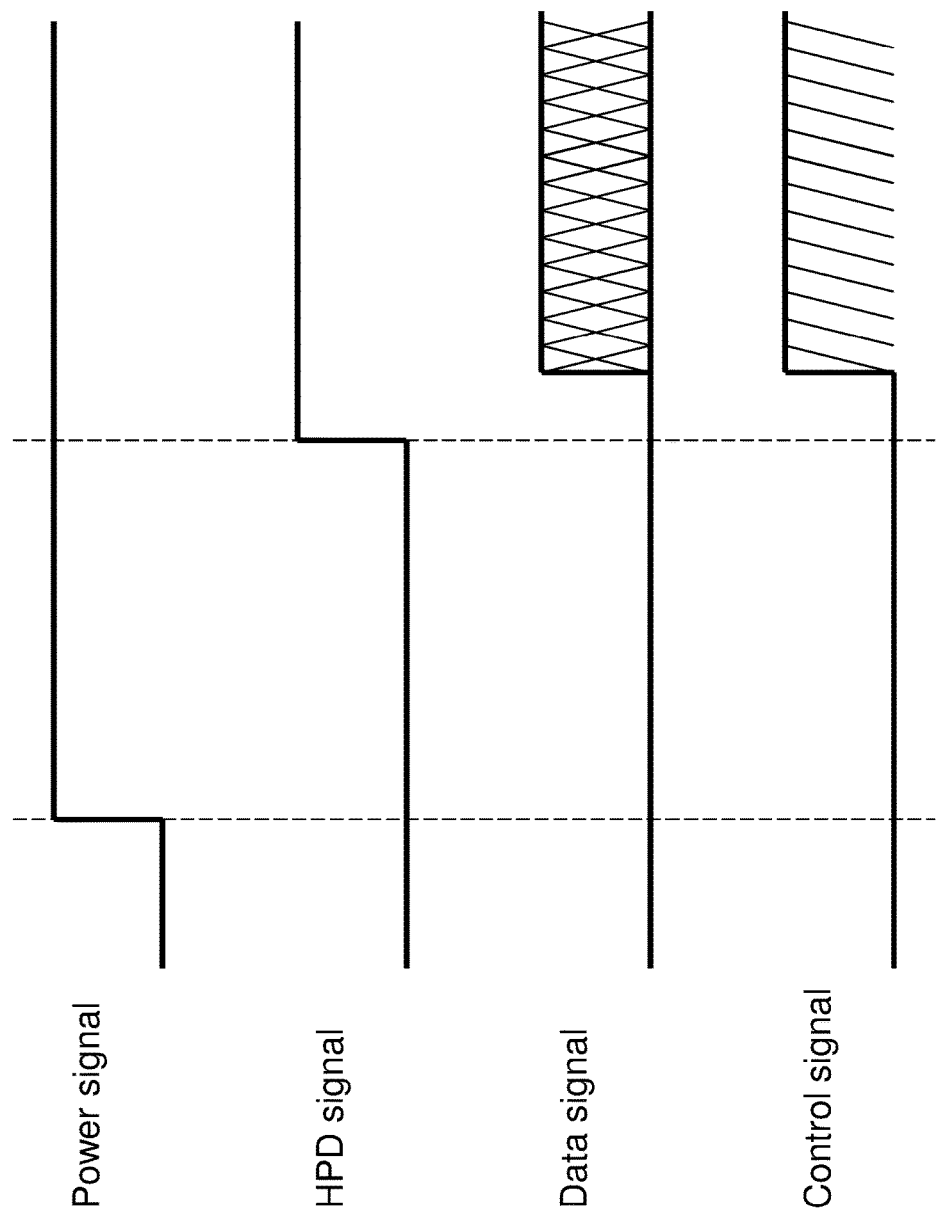

In practice, a starting point of the predetermined time interval may be determined according to one of the following conditions: a time point at which the video processing device 300 receives a power signal (e.g., a +5V voltage) from the transmitter 10; and a time point at which the video processing device 300 sends a hot-plug detection (HPD) signal to the transmitter 10 in response to the power signal. FIG. 4 shows a power signal received by the video processing device 300, an HPD signal sent by the video processing device 300, a data signal (e.g., a transition minimized differential signaling (TMDS) signal or a video related signal) the video processing device 300 receives from the transmitter 10, and a control signal the video processing device 300 receives from the transmitter 10 (e.g., an $I^2C$ control signal via the DDC channel). In the drawing, the waveforms of the signals are illustrative, and the dotted lines indicate time points. It is known from FIG. 4 that, the video processing device 300 receives the data signal and control signal from the transmitter only after sending the HPD signal (i.e., the transmitter 10 sends the data signal and the control signal only after receiving the HPD signal). Thus, the starting point of the predetermined time interval may be determined according to a time point at which the video processing device 300 sends the HPD signal. For example, the time point at which the video processing device 300 sends the HPD signal is used as the starting point of the predetermined time interval, or a predetermined time point earlier than the time point at which the video processing device 300 sends the HPD signal (e.g., a time point that is 100 ms earlier) is used as the starting point of the predetermined time interval. On the other hand, the starting point of the predetermined time interval may also be determined by a time point at which the video processing device 300 receives the power signal from the transmitter 10. For example, a time point at which the video processing device 300 receives the power signal from the transmitter 10 is used as the starting point of the predetermined time interval, or a time point later than the time point at which the video processing device 300 receives the power signal from the transmitter 10 (e.g., a time point that is 100 ms later) is used as the starting point of the predetermined time interval.

Figure 5:
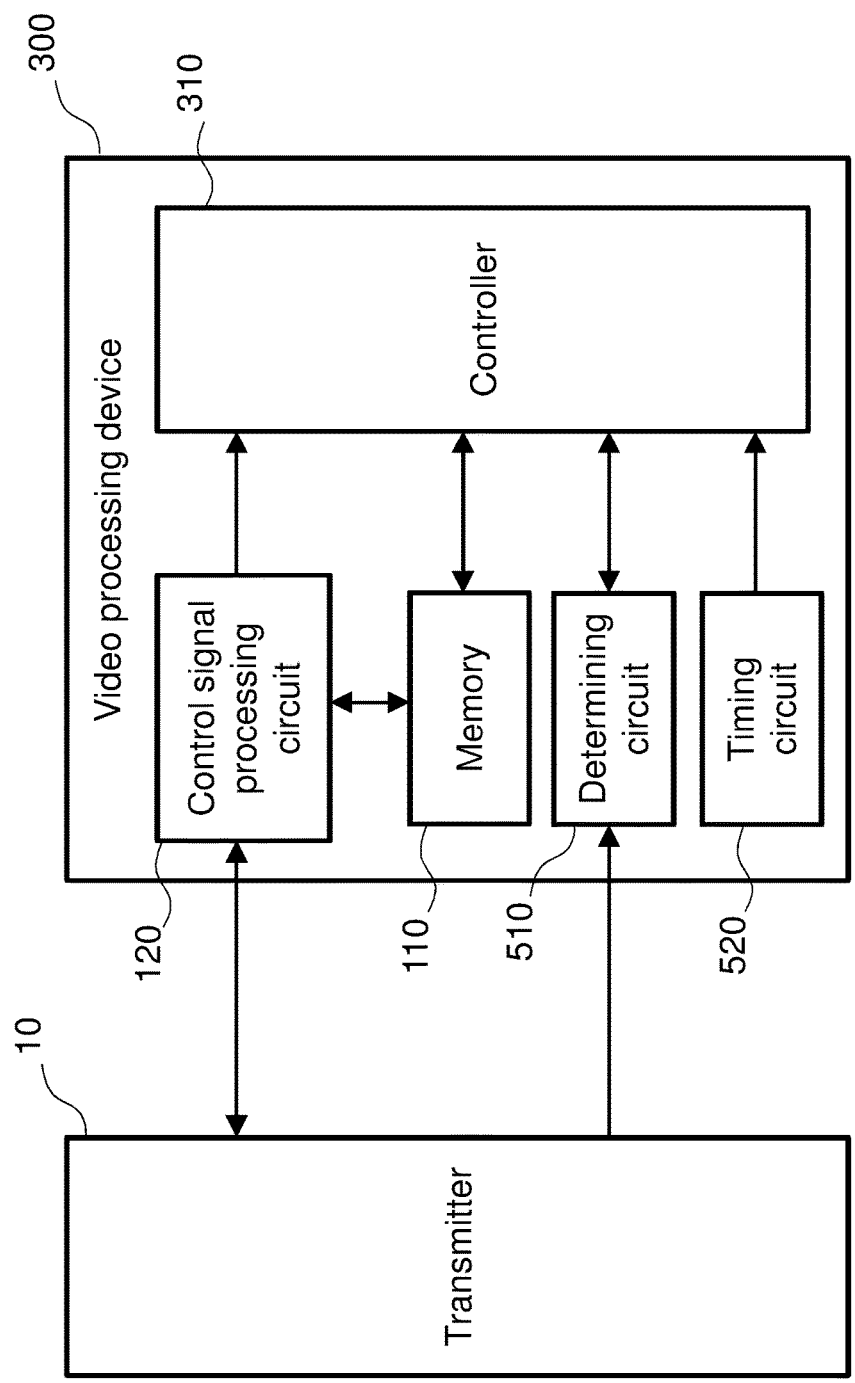
FIG. 5 is a block diagram of the video processing device in FIG. 3 further including a determining circuit and a timing circuit.
Figure 6:
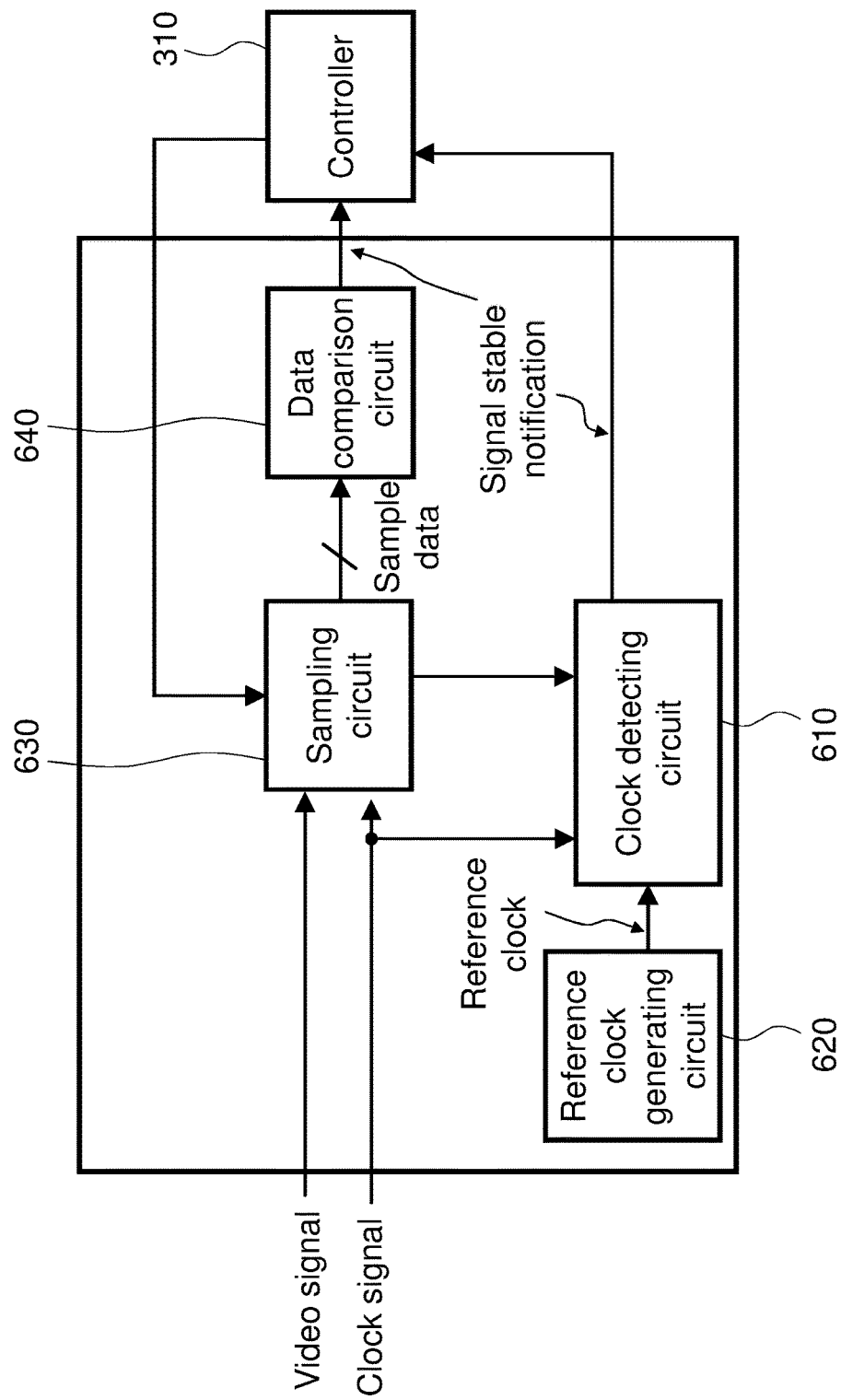
FIG. 6 is a block diagram of the determining circuit in FIG. 5.

When the predetermined time interval ends, the controller 310 receives at least one of a signal stable notification and a timing end notification. More specifically, the signal stable notification may be generated by a determining circuit, and the timing end notification may be generated by a timing circuit. At least one of the determining circuit and the timing circuit may be included in the video processing device 300, as shown in FIG. 5. However, these two circuits may also be independently disposed outside the video processing circuit 300. Referring to FIG. 5, a determining circuit 510 determines whether at least one a clock signal and a video signal from the transmitter 10 is stable to accordingly generate the signal stable notification. For example, the determining circuit 510 may determine whether the frequency or period of the clock signal is stable, or determine whether a signal pattern or characteristic of the video signal is stable (e.g., determining whether a data enable range indicated by the video signal falls in a predetermined range) to accordingly generate the signal stable notification. FIG. 6 shows the determining circuit 510 according to an embodiment of the present invention. A clock detecting circuit 610 in FIG. 6 detects whether a clock signal received from the transmitter 10 is stable according to a reference clock of a reference clock generating circuit 620, and accordingly generates the foregoing signal stable notification to inform the controller whether the video signal is stable. A sampling circuit 630 in FIG. 6 samples the video signal from the transmitter 10 to generate sample data. A data comparison circuit 640 compares the sample data with predetermined data to generate a comparison result, which may be used as the signal stable notification for the controller 310 to accordingly determine whether the video signal is stable. Further details associated with FIG. 6 may be referred the Taiwan Patent Application No. 105119511, "High-Definition Multimedia Interface Receiving Circuit and Method for Determining Transmission Mode", of the Applicant. Further, as shown in FIG. 5, the timing circuit 520 starts timing from the starting point of the predetermined time interval, and generates the timing end notification when a timed period reaches a predetermined time length. The timing circuit 520 alone is generally known art.

Figure 7:
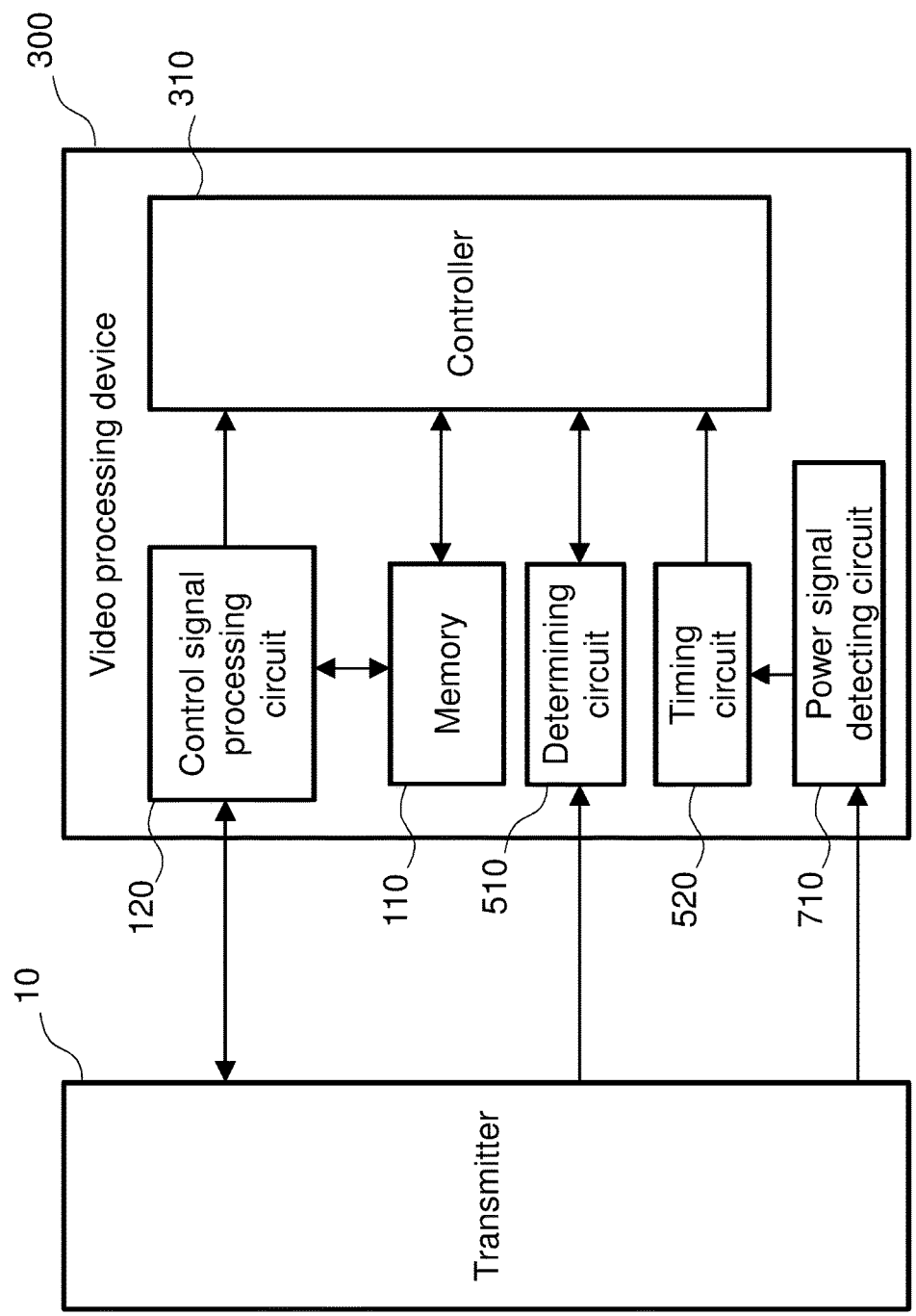
FIG. 7 is a block diagram of the video processing device in FIG. 5 further including a power signal detecting circuit.

The video processing device 300 in FIG. 7 further includes a power signal detecting circuit 710. When the starting point of the predetermined time interval is the time point at which the power signal from the transmitter 10 is received, the power signal detecting signal 710 notifies the timing circuit 520 to start timing upon receiving the power signal from the transmitter 10. The power signal detecting circuit 710 alone is generally known art.

Figure 8:
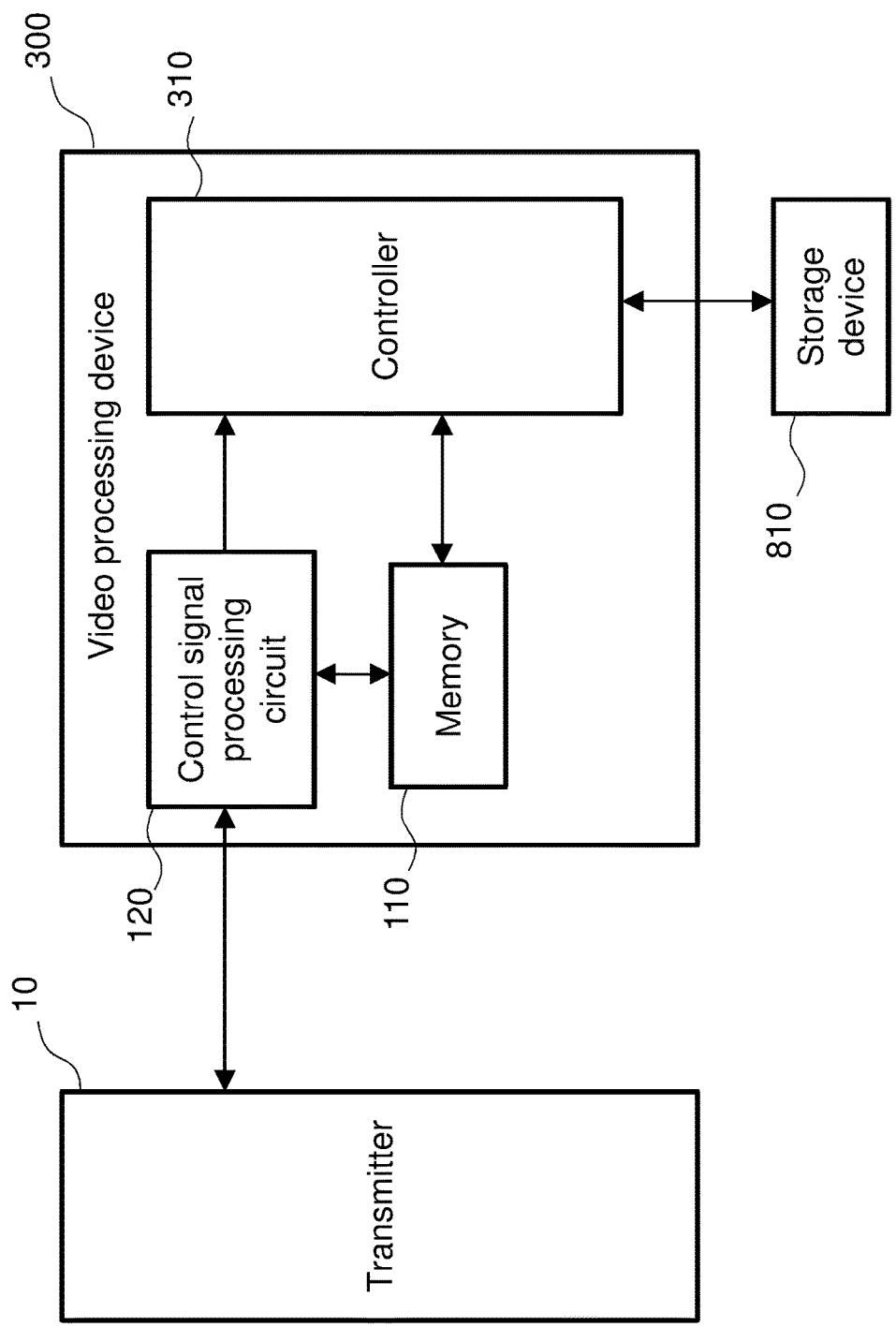
FIG. 8 is a block diagram of the controller in FIG. 3 reading a display parameter and writing the display parameter to a memory.

As previously described, a controller (e.g., the controller 310 in FIG. 3) may perform an overwriting operation to achieve the parameter replacement in step S230 or S240. More specifically, referring to FIG. 8, when the data access address indicated by the transmitter 10 satisfies the predetermined access address and the predetermined mode is the second mode, the controller 310 reads the display parameter of the first mode from a storage device 810, and accordingly overwrites the display parameter of the predetermined mode in the memory 110. For example, the memory device 810 is a non-volatile storage device (e.g., a flash memory, or a read-only memory) or a volatile storage device (e.g., a random access memory). When the data access address does not satisfy the predetermined access address and the predetermined mode is the first mode, the controller 310 reads the display parameter of the second mode from the storage device 810, and accordingly overwrites the display parameter of the predetermined mode in the memory 110. In FIG. 8, the storage device 810 is an independent unit outside the video processing device 300. In an alternative embodiment, the storage device 810 may be included in the video processing device 300.

Figure 9:
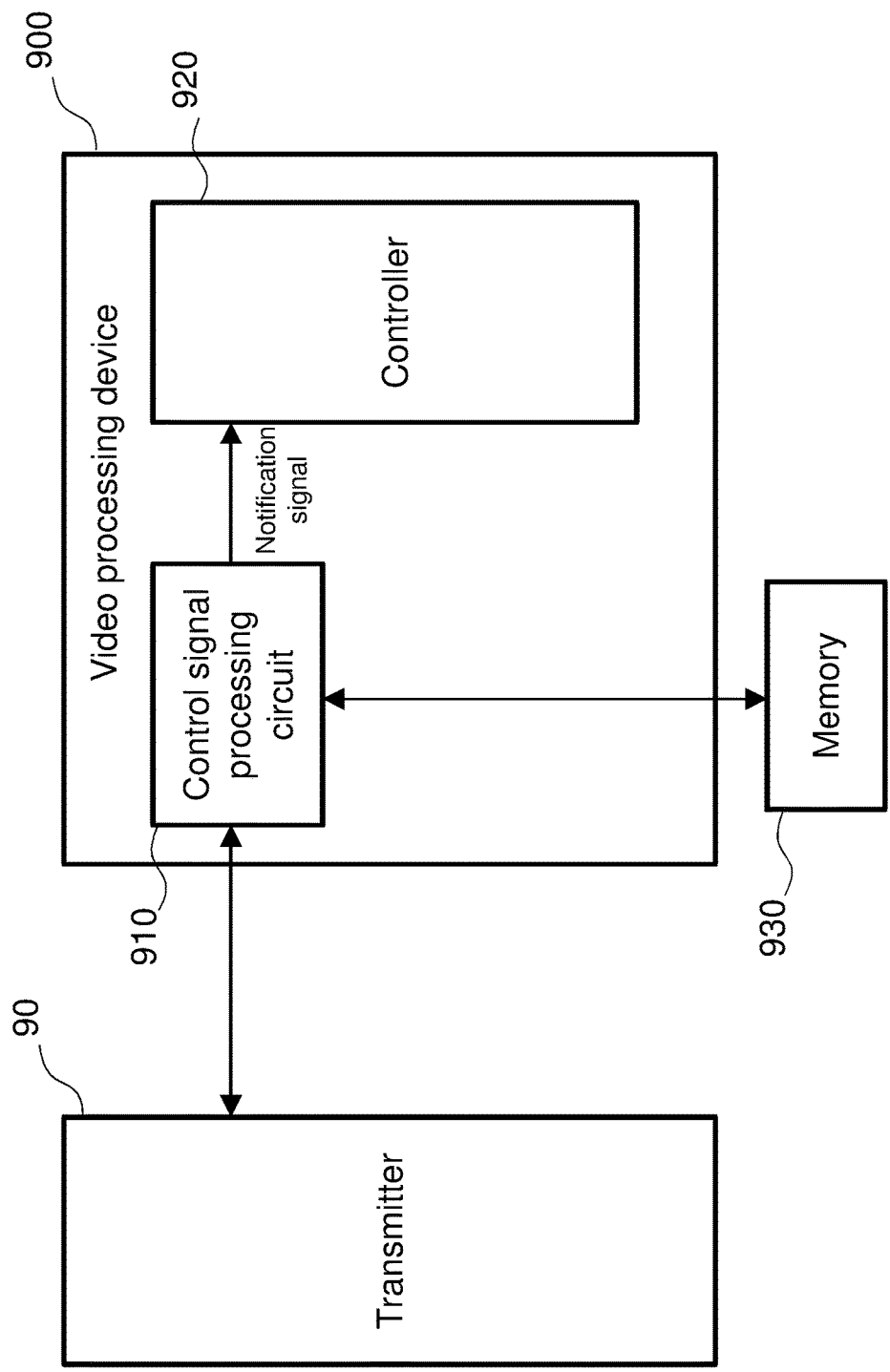
FIG. 9 is a block diagram of a video processing device according to another embodiment of the present invention.

FIG. 9 shows a video processing device according to another embodiment of the present invention. Compared to FIG. 1, a video processing device 900 in FIG. 9 does not necessarily include a memory (e.g., the memory 110 in FIG. 1 in one embodiment). In other words, the memory 930 may be an independent unit outside the video processing device 900. The video processing device 900 in FIG. 9 includes a control signal processing circuit 910 and a controller 920. The control signal processing circuit 910 receives a control signal from a transmitter 90, and, according to at least one data access address indicated by the control signal, performs at least steps of determining whether the data access address satisfies a predetermined access address, and outputting a notification signal when the data access address satisfies the predetermined access address. The controller 920 causes the video processing device 900 to operate in a first mode according to the notification signal, and causes the video processing device 900 to operate in a second mode when the notification signal is not received within a predetermined time interval.

Figure 10:
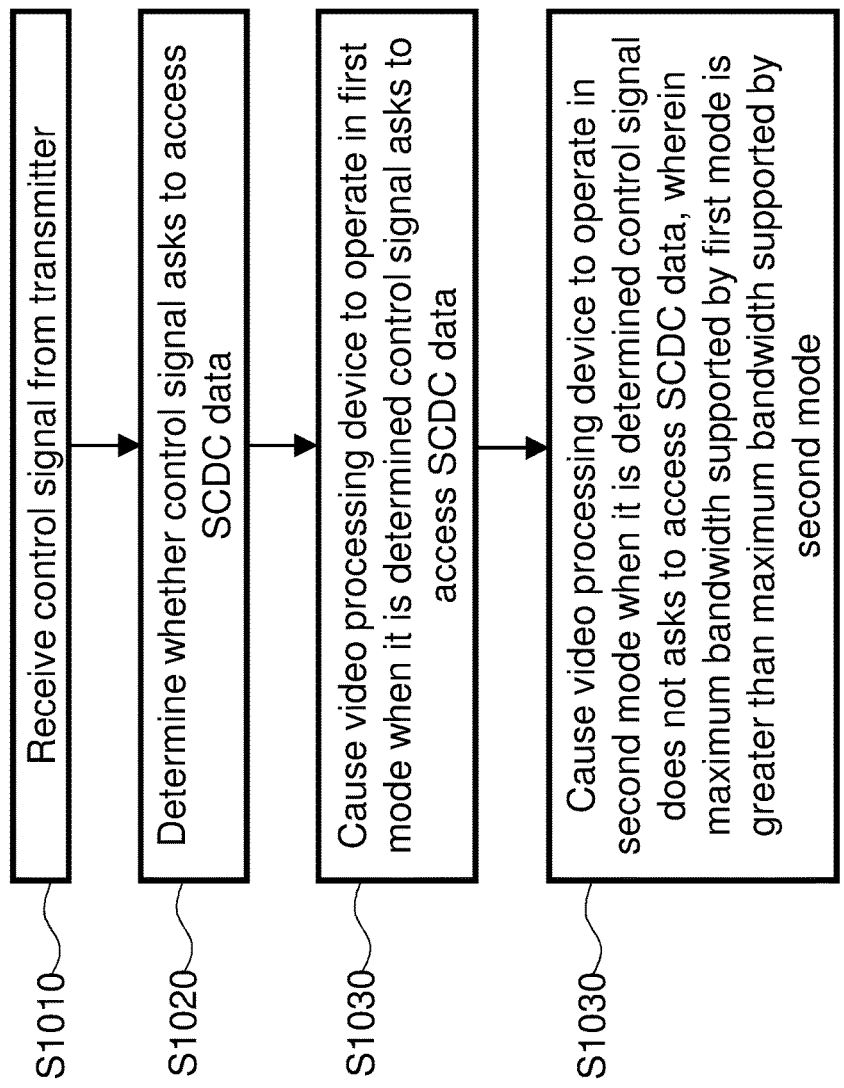
FIG. 10 is a flowchart of a video processing method according to an embodiment of the present invention.

FIG. 10 shows a flowchart of a video processing method according to an embodiment of the present invention. The method is in form of software and/or firmware, and is performed by the video processing device of the present invention or an equivalent device. According to an embodiment of the present invention, the method is capable of automatically determining an operation mode, and includes following steps.

In step S1010, a control signal from a transmitter is received. This step may be performed by the control signal processing circuit 120 in FIG. 3 or an equivalent circuit.

In step S1020, it is determined whether the control signal asks to access status and control data channel (SCDC) data. This step may be performed by the control signal processing circuit 120 in FIG. 3 or an equivalent circuit.

In step S1030, when it is determined that the control signal asks to access the SCDC data, the video processing device is caused to operate in a first mode. This step may be performed by the controller 310 in FIG. 3 or an equivalent circuit.

In step S1040, when it is determined that the control signal does not ask to access the SCDC data, the video processing device is caused to operate in a second mode. The maximum bandwidth supported by the first mode is larger than the maximum bandwidth supported by the second mode. This step may be performed by the controller 310 in FIG. 3 or an equivalent circuit.

One person having ordinary skill in the art can deduce the details and variations of the embodiments in FIG. 9 and FIG. 10 based on the disclosure of the embodiments in FIG. 1 to FIG. 8. More specifically, the technical features of the embodiments in FIG. 1 to FIG. 8 may be reasonably applied to the embodiments in FIG. 9 and FIG. 10. These repeated details are omitted herein.

In conclusion, the device and method of the present invention are capable of automatically determining an operation mode according to whether the transmitter asks to access data of a predetermined address, hence eliminating inconveniences and trouble caused by human determination of the prior art.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A video processing device, capable of automatically determining an operation mode, comprising:
    a memory, storing a display parameter of a predetermined mode;
    a control signal processing circuit, receiving a control signal from a transmitter, and performing following steps according to at least one data access address indicated by the control signal when the predetermined mode is a first mode:
        determining whether the data access address satisfies a predetermined access address;
        outputting the display parameter of the predetermined mode in the memory to the transmitter when the data access address satisfies the predetermined access address; and
        outputting a display parameter of a second mode to the transmitter after the display parameter of the predetermined mode in the memory is replaced by the display parameter of the second mode when the data access address does not satisfy the predetermined access address, and
    a controller, causing the video processing device to operate in a first mode when the control signal processing circuit determines that the data access address satisfies the predetermined access address within a predetermined time interval, and causing the video processing device to operate in a second mode when the control signal processing circuit does not determine that the data access address satisfies the predetermined access address within the predetermined time interval.

2. The video processing device according to claim 1, wherein the predetermined time interval ends when the controller receives a signal stable notification, the video processing device further comprising:
    a determining circuit, determining whether at least one of a clock signal and a video signal from the transmitter is stable to accordingly generate the signal stable notification.

3. The video processing device according to claim 1, wherein a starting point of the predetermined time interval is determined according to one of a time point at which the video processing device receives a power signal of the transmitter, and a time point at which the video processing device sends a hot-plug detection (HPD) signal.

4. The video processing device according to claim 3, wherein the predetermined time interval ends when the controller receives a time end notification, the video processing device further comprising:
    a timing circuit, starting timing from the starting point of the predetermined time interval, and generating the timing end notification when a timed period reaches a predetermined time length.

5. The video processing device according to claim 1, wherein when the predetermined mode is the second mode, the control signal processing circuit, according to the at least one data access address indicated by the control signal, performs at least steps of:
    determining whether the data access address satisfies the predetermined access address;
    when the data access address satisfies the predetermined access address, outputting a display parameter of the first mode to the transmitter after the display parameter of the predetermined mode in the memory is replaced by the display parameter of the first mode; and
    when the data access address does not satisfy the predetermined access address, outputting the display parameter of the predetermined mode to the transmitter.

6. The video processing device according to claim 5, wherein when the data access address satisfies the predetermined access address and the predetermined mode is the second mode, the controller reads the display parameter of the first mode from a storage device, and overwrites the display parameter of the predetermined parameter in the memory by the display parameter of the first mode; when the data access address does not satisfy the predetermined access address and the predetermined mode is the first mode, the controller reads the display parameter of the second mode from the storage device, and overwrites the display parameter of the predetermined mode by the display parameter of the second mode.

7. The video processing device according to claim 5, wherein the display parameter of the first mode and the display parameter of the second mode are both stored in the memory, when the data access address satisfies the predetermined access address and the predetermined mode is the second mode, the control signal processing circuit replaces the display parameter of the predetermined mode by the display parameter of the first mode in the memory; when the data access address does not satisfy the predetermined access address and the predetermined mode is the first mode, the control signal processing circuit replaces the display parameter of the predetermined mode by the display parameter of the second mode in the memory.

8. The video processing device according to claim 1, wherein the predetermined access address corresponds to an address of a status and control data channel (SCDC) data.

9. The video processing device according to claim 1, wherein the control signal processing circuit is an inter-integrated circuit (I2C) circuit, and the control signal processing circuit receives the control signal from the transmitter through a display data channel (DDC).

10. The video processing device according to claim 1, wherein the first mode is compliant with specifications of High Definition Multimedia Interface 2.0 (HDMI 2.0) or later versions, and the second mode is compliant with specifications of versions earlier than HDMI 2.0.

11. A video processing device, capable of automatically determining an operation mode, comprising:

a control signal processing circuit, receiving a control signal from a transmitter, and, according to at least one data access address indicated by the control signal, performing at least steps of:
  determining whether the data access address satisfies a predetermined access address; and
  outputting a notification signal when the data access address satisfies the predetermined access address;
a controller, causing the video processing device to operate in a first mode according to the notification signal, and causing the video processing device to operate in a second mode when the notification signal is not received within a predetermined time interval; and
a memory, storing at least one of a display parameter of a first mode and a display parameter of the second mode,
  wherein when the video processing device operates in the first mode, the control signal processing device outputs the display parameter of the first mode to the transmitter, and when the video processing device operates in the second mode the control signal processing circuit outputs the display parameter of the second mode to the transmitter.

12. The video processing device according to claim 11, wherein the predetermined time interval ends when the controller receives a signal stable notification, the video processing device further comprising:
  a determining circuit, determining whether at least one of a clock signal and a video signal from the transmitter is stable to accordingly generate the signal stable notification.

13. The video processing device according to claim 11, wherein a starting point of the predetermined time interval is determined according to one of a time point at which the video processing device receives a power signal of the transmitter, and a time point at which the video processing device sends a hot-plug detection (HPD) signal.

14. The video processing device according to claim 13, wherein the predetermined time interval ends when the controller receives a time end notification, the video processing device further comprising:
  a timing circuit, starting timing from the starting point of the predetermined time interval, and generating the timing end notification when a timed period reaches a predetermined time length.

15. The video processing device according to claim 11, wherein the control signal processing circuit is an inter-integrated circuit (I2C) circuit, and the control signal processing circuit receives the control signal from the transmitter through a display data channel (DDC).

16. The video processing device according to claim 11, wherein the predetermined access address corresponds to an address of a status and control data channel (SCDC) data.

17. A video processing method, capable of automatically determining an operation mode, performed by a video processing device, the video processing method comprising:
  receiving a control signal from a transmitter;
  determining whether the control signal asks to access status and control data channel (SCDC) data;
  causing the video processing device to operate in a first mode when it is determined that the control signal asks to access the SCDC data;
  causing the video processing device to operate in a second mode when the control signal does not ask to access the SCDC data, and
  outputting a first display parameter of the first mode to the transmitter when the video processing device operates in the first mode, and outputting a second display parameter of the second mode to the transmitter when the video processing device operates in the second mode;
  wherein a maximum bandwidth supported by the first mode is larger than a maximum bandwidth supported by the second mode.

* * * * *